(12) United States Patent
Maejima

(10) Patent No.: US 8,130,026 B2
(45) Date of Patent: Mar. 6, 2012

(54) BOOSTER CIRCUIT AND VOLTAGE SUPPLY CIRCUIT

(75) Inventor: Hiroshi Maejima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/032,339

(22) Filed: Feb. 22, 2011

(65) Prior Publication Data

US 2011/0140766 A1    Jun. 16, 2011

Related U.S. Application Data

(63) Continuation of application No. 12/646,531, filed on Dec. 23, 2009, now Pat. No. 7,902,905, which is a continuation of application No. 11/844,728, filed on Aug. 24, 2007, now Pat. No. 7,656,221.

(30) Foreign Application Priority Data

Aug. 28, 2006  (JP) ................................. 2006-230737

(51) Int. Cl.
*H03K 3/01*    (2006.01)
(52) U.S. Cl. .......................... 327/534; 327/536; 327/589
(58) Field of Classification Search .......... 327/534–537, 327/589
See application file for complete search history.

(56) References Cited

U.S. PATENT DOCUMENTS

| | | | |
|---|---|---|---|
| 5,703,807 A * | 12/1997 | Smayling et al. | ........ 365/185.03 |
| 6,297,687 B1 | 10/2001 | Sugimura | |
| 6,573,811 B2 | 6/2003 | Martin | |
| 6,791,212 B2 | 9/2004 | Pulvirenti et al. | |
| 6,798,274 B2 | 9/2004 | Tanimoto | |
| 7,116,088 B2 | 10/2006 | Tran et al. | |
| 7,157,960 B2 * | 1/2007 | Kim et al. | ...................... 327/536 |
| 7,176,748 B2 * | 2/2007 | Khouri et al. | ................. 327/536 |
| 7,253,676 B2 | 8/2007 | Fukuda et al. | |
| 7,417,488 B2 | 8/2008 | Ahmed et al. | |
| 7,656,221 B2 * | 2/2010 | Maejima | ....................... 327/534 |
| 7,902,905 B2 * | 3/2011 | Maejima | ....................... 327/534 |
| 2005/0168263 A1 | 8/2005 | Fukuda et al. | |

FOREIGN PATENT DOCUMENTS

| | | |
|---|---|---|
| JP | 11-154396 | 6/1999 |
| JP | 2000-350439 | 12/2000 |
| JP | 2005-190533 | 7/2005 |

OTHER PUBLICATIONS

Japanese Office Action issued Sep. 2, 2011, in Patent Application No. 2006-230737 (with English-language translation).

* cited by examiner

*Primary Examiner* — Dinh T. Le

(74) *Attorney, Agent, or Firm* — Oblon, Spivak, McClelland, Maier & Neustadt, L.L.P.

(57) ABSTRACT

A booster circuit includes a pump circuit having a plurality of charge pump circuits for outputting a boosted voltage to a first output terminal. The booster circuit also includes a clock adjusting circuit that generates, from a first clock signal, a second clock signal for operating the charge pump circuits. A pump controlling circuit outputs the first clock signal for operating the pump circuit. A first comparator outputs a first output signal. A second comparator outputs a second output signal. A third comparator outputs a third output signal. A gradient of the boosted voltage is decreased when the first output signal is output. A frequency of the first clock signal is reduced when the second output signal is output. The third output signal is output when the boosted voltage is higher than a set value of the boosted voltage.

12 Claims, 11 Drawing Sheets

BOOSTER CIRCUIT AND VOLTAGE SUPPLY CIRCUIT

CROSS-REFERENCE TO RELATED APPLICATIONS

This application is a continuation of and claims the benefit of priority under 35 U.S.C. §120 from U.S. Ser. No. 12/646,531, filed Dec. 23, 2009, which is a continuation of U.S. Ser. No. 11/844,728, filed Aug. 24, 2007, now U.S. Pat. No. 7,656,221, and from the prior Japanese Patent Application No. 2006-230737, filed on Aug. 28, 2006. The entire contents of all of those documents are incorporated herein by reference.

BACKGROUND

1. Technical Field

The present invention relates to a booster circuit having a charge pump circuit for boosting a power supply voltage, and a voltage supply circuit having the booster circuit.

2. Background Art

Conventional semiconductor storage devices, such as a NAND flash memory, have a booster circuit that supplies the power supply voltage after boosting the voltage by means of a charge pump circuit.

Semiconductor storage devices, such as a NAND flash memory, require a potential higher than the power supply voltage to carry out data writing, erasing and reading. Thus, the booster circuit for such semiconductor storage devices has a charge pump circuit for boosting the power supply voltage and a voltage detecting circuit for keeping the potential at a preset potential.

The charge pump circuit for boosting the power supply voltage has MOS transistors and capacitors connected in series to each other, and a CLK signal and a CLKB signal, which are complementary to each other, are coupled to one ends of the capacitors.

The voltage detecting circuit has a voltage dividing circuit and a comparator, and the output terminal of the booster circuit and the ground potential are connected in series to each other via the voltage dividing circuit. The comparator compares a monitor potential output from the voltage dividing circuit with a reference potential.

In order to change the detection level of the voltage detecting circuit, for example, a plurality of n-type MOS transistors connected to the ground potential at the respective sources are connected to a point of connection between the voltage dividing resistors of the voltage dividing circuit, and selection signals are input to the gates of the n-type MOS transistors.

The selection signals designate the set potential of the charge pump circuit. If the output of the charge pump circuit is lower than the set potential, the monitor potential is lower than the reference potential, and the comparator switches the output to "High", for example. This output brings the charge pump circuit into the active state, and the output of the charge pump circuit is boosted according to the CLK/CLKB signal.

On the other hand, if the output of the charge pump circuit is higher than the set potential, the monitor potential is higher than the reference potential, and the comparator switches the output to "Low", for example. This output brings the charge pump circuit into the inactive state, the CLK/CLKB signal is blocked, and the boosting operation of the charge pump circuit is stopped.

As described above, the output of the charge pump circuit can be maintained in the vicinity of the set potential by the voltage detecting circuit bringing the charge pump circuit into the active or inactive state.

In the boosting operation described above, the output voltage is not always kept at a constant potential and fluctuates around the set potential. This phenomenon is referred to as ripple, and the ripple increases or decreases according to the RC time constant, which is based on the resistances of the voltage dividing resistors, the delay in operation of the comparator, and the boosting capability of the charge pump circuit. The ripple increases if the resistances of the voltage dividing resistors are high, if the delay in operation of the comparator is high, or if the boosting capability of the charge pump circuit is high.

Supposing that the resistance values of the voltage dividing resistors are fixed, and the same comparator is used, the speed of response of the voltage detecting circuit to a variation in potential of the charge pump circuit is constant. Therefore, the time required to switch the output of the voltage detecting circuit is substantially constant.

Furthermore, the output voltage and output current of the booster circuit are related with each other in such a manner that the output current of the booster circuit is low when the output voltage is high, and the output current of the booster circuit is high when the output voltage is low.

Therefore, when the set potential of the voltage detecting circuit is low, the ripple in the output of the booster circuit increases because the amount of current that can be output in a certain time is large.

On the other hand, when the set potential of the voltage detecting circuit is high, the ripple decreases because the amount of current that can be output in a certain time is small.

By the way, data is written to cells of the NAND flash memory using the potential boosted by the booster circuit.

However, the cells do not have uniform characteristics, and the write enable potential, which enables writing to the cell, is different for each cell.

Thus, in order that writing of the cells can be successively carried out in ascending order of write enable potential, the writing potential is increased in small increments from an appropriate initial value, and the writing operation is carried out every time the writing potential is increased.

To achieve this operation, the voltage dividing resistors of the voltage detecting circuit, which determine the set potential of the booster circuit, are adjusted to provide a booster circuit output at a desired potential that increases in small increments.

When the set potential is changed, as described above, there arises a problem that the ripple in the booster circuit output increases if the set potential is low.

In the writing operation of the cells of the NAND flash memory, if the ripple on the word lines of the selected cells and unselected cells is large, the threshold (Vth) distribution of the cell to be written is expanded, and an erroneous writing to an unselected cell occurs, for example. Thus, it is preferred that the ripple is small.

However, as described above, for a conventional booster circuit, if a low booster circuit output is set by adjusting the voltage dividing resistors of the voltage detecting circuit when writing to a cell with a low write enable potential, a large ripple occurs, and the performance of writing to the cell is degraded.

There has been proposed a conventional booster circuit has a plurality of charge pump circuits that boosts a voltage supplied from a power supply to produce an output voltage, a plurality of CP (charge pump) output controlling circuits that monitor the output voltage and outputs a signal that indicates whether to activate or inactivate the charge pump circuits, an oscillator that receives the output of the CP output controlling circuit (the voltage for OSC controlling operation), and a clock buffer circuit that receives the oscillation output of the oscillator and outputs a signal to the booster circuit (see Japanese Patent Laid-Open Publication No. 11-154396, for example).

The CP output controlling circuits are designed to have different output detecting voltages so that a stepwise operation according to the shift of the output voltage can be achieved.

The conventional booster circuit adjusts the number of charge pump circuits that operate stepwise according to the shift of the output voltage, thereby reducing the ripple for one certain set potential.

That is, the conventional technique is not intended to reduce the ripple for a plurality of set potentials.

BRIEF SUMMARY

A booster circuit according to one example of the invention includes a pump circuit having a plurality of charge pump circuits for outputting a boosted voltage to a first output terminal. The booster circuit also includes a clock adjusting circuit that generates, from a first clock signal, a second clock signal for operating the charge pump circuits. A pump controlling circuit outputs the first clock signal for operating the pump circuit. A first comparator outputs a first output signal. A second comparator outputs a second output signal. A third comparator outputs a third output signal. A gradient of the boosted voltage is decreased when the first output signal is output. A frequency of the first clock signal is reduced when the second output signal is output. The third output signal is output when the boosted voltage is higher than a set value of the boosted voltage.

DETAILED DESCRIPTION

In the following, an embodiment of the present invention will be described with reference to the drawings.

Embodiment

Figure 1:
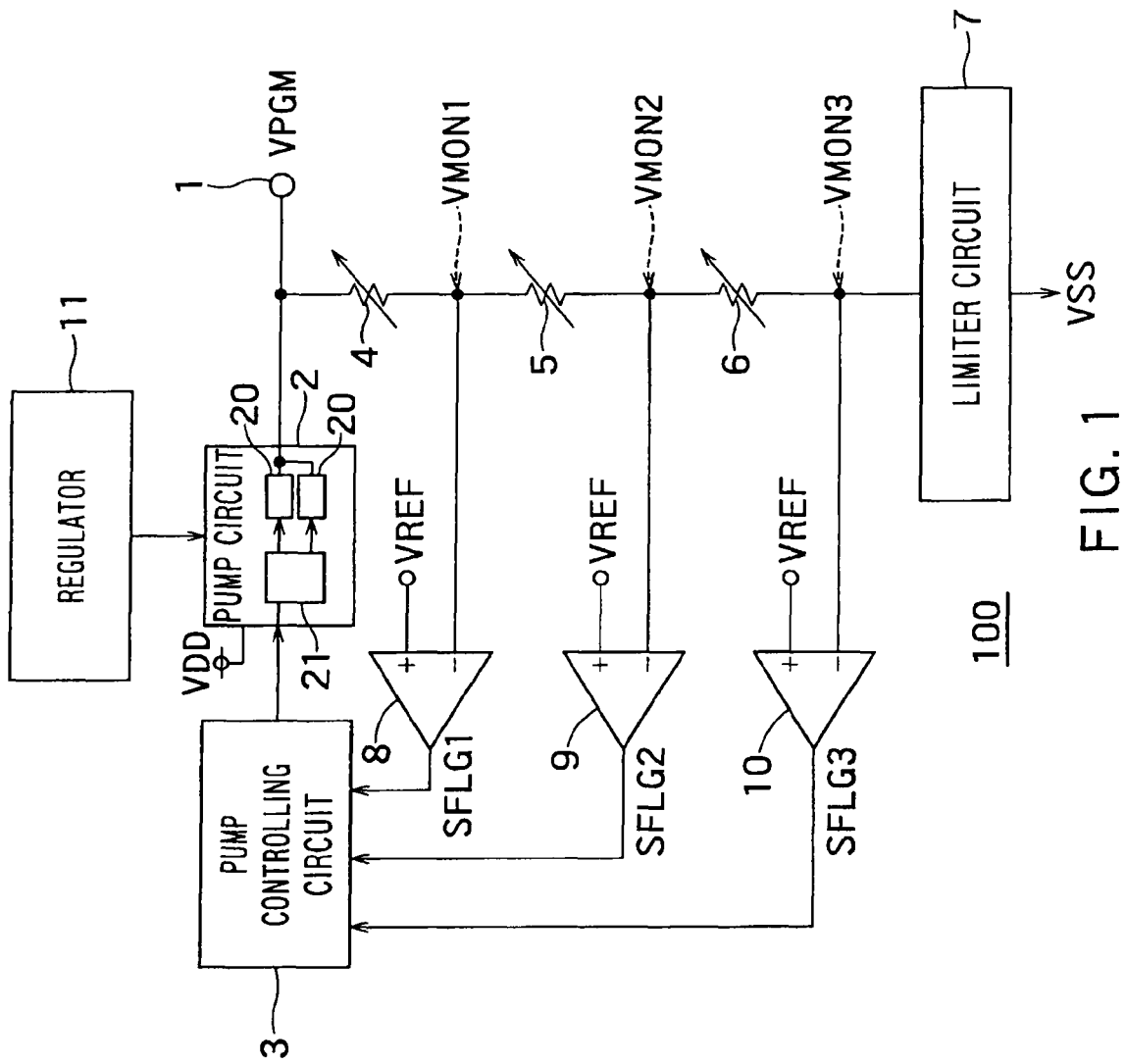
FIG. 1 is a diagram showing a configuration of essential parts of a booster circuit 100 according to an embodiment of the present invention.
Figure 2:
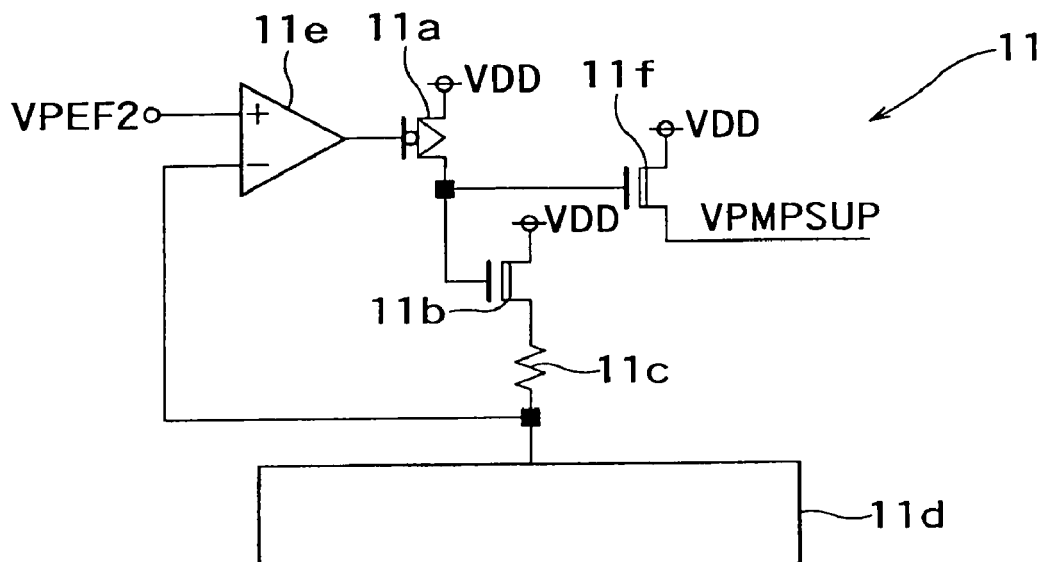
FIG. 2 is a circuit diagram showing an example of a regulator used in the booster circuit shown in FIG. 1.
Figure 3:
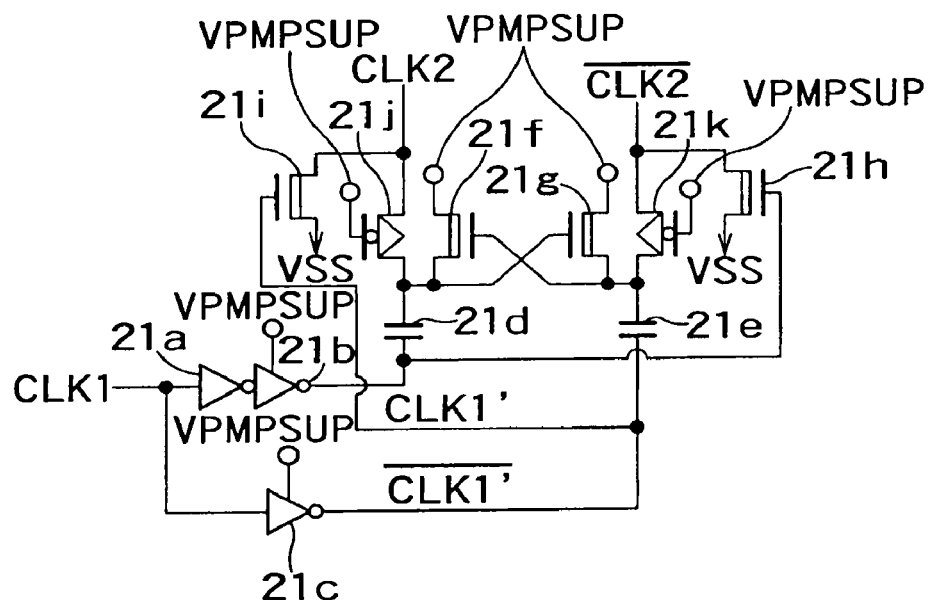
FIG. 3 is a circuit diagram showing an example of a clock adjusting circuit of a pump circuit used in the booster circuit shown in FIG. 1.
Figure 4:
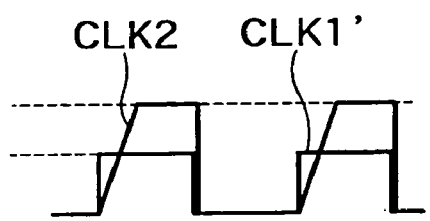
FIG. 4 is a diagram showing an example of a waveform of a second clock signal output from the clock adjusting circuit shown in FIG. 3.
Figure 5:
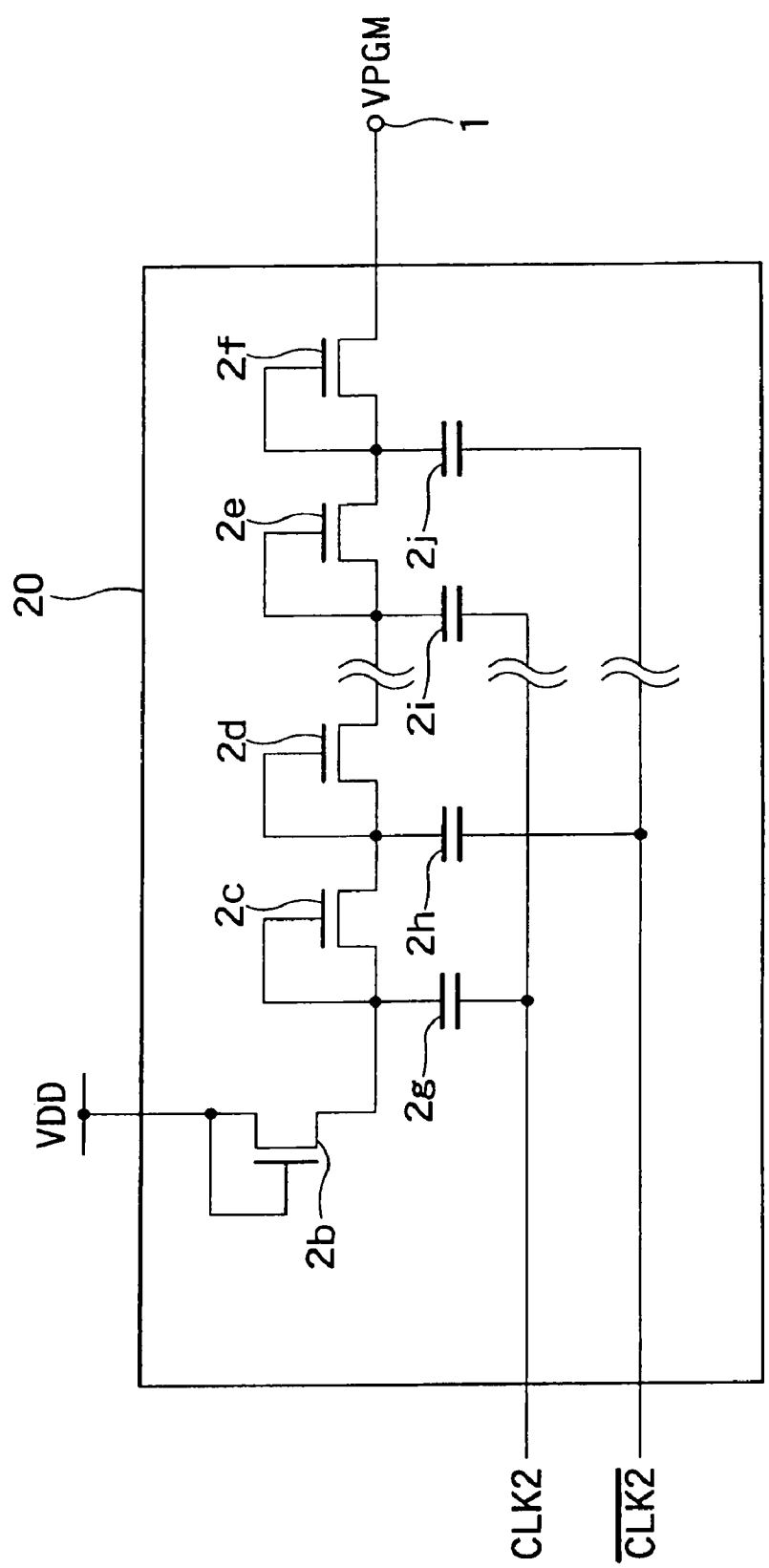
FIG. 5 is a circuit diagram showing an example of a charge pump circuit of the pump circuit used in the booster circuit shown in FIG. 1.

FIG. 1 is a diagram showing a configuration of essential parts of a booster circuit 100 according to an embodiment of the present invention. FIG. 2 is a circuit diagram showing an example of a regulator used in the booster circuit shown in FIG. 1. FIG. 3 is a circuit diagram showing an example of a clock adjusting circuit of a pump circuit used in the booster circuit shown in FIG. 1. FIG. 4 is a diagram showing an example of a waveform of a second clock signal output from the clock adjusting circuit shown in FIG. 3. FIG. 5 is a circuit diagram showing an example of a charge pump circuit of the pump circuit used in the booster circuit shown in FIG. 1.

As shown in FIG. 1, the booster circuit 100 has a pump circuit 2 having a plurality of charge pump circuits 20 that boosts the voltage supplied from a power supply "VDD" and outputs the boosted voltage to a first output terminal 1, and a pump controlling circuit 3 that outputs a first clock signal "CLK1" for operating the pump circuit 2 to control the pump circuit 2.

Loads connected to the first output terminal 1 include a nonvolatile semiconductor storage device, such as an EEPROM of a NAND cell type, a NOR cell type, a DINOR cell type or an AND cell type, and a circuit that requires a voltage higher than that of the power supply "VDD".

Furthermore, the booster circuit 100 has a first variable resistor 4 connected to the first output terminal 1 at one end thereof, a second variable resistor 5 connected to the other end of the first variable resistor 4 at one end thereof, a third variable resistor 6 connected to the other end of the second variable resistor 5 at one end thereof, and a limiter circuit 7 that is connected between the other end of the third variable resistor 6 and a ground potential "VSS" and composed of a variable resistor and can adjust the current flowing through the first variable resistor 4, the second variable resistor 5 and the third variable resistor 6.

Furthermore, the booster circuit 100 has a first comparator 8 that receives a first monitor voltage "VMON1" at the other end of the first variable resistor 4 at the inverting input terminal thereof and a reference voltage "VREF" at the non-inverting input terminal thereof, a second comparator 9 that receives a second monitor voltage "VMON2" at the other end of the second variable resistor 5 at the inverting input terminal thereof and the reference voltage "VREF" at the non-inverting input terminal thereof, and a third comparator 10 that receives a third monitor voltage "VMON3" at the other end of the third variable resistor 6 at the inverting input terminal thereof and the reference voltage "VREF" at the non-inverting input terminal thereof.

The pump controlling circuit 3 controls the pump circuit 2 to reduce that the number of active charge pump circuits 20 according to the output signal of any one of the first comparator 8 and the second comparator 9.

Specifically, in this embodiment, the pump controlling circuit 3 controls the pump circuit 2 to reduce the number of active charge pump circuits 20 according to an output signal "SFLG1" of the first comparator 8 when the first comparator 8 determines that the first monitor voltage "VMON1" is higher than the reference voltage "VREF".

Besides, the pump controlling circuit 3 controls the pump circuit 2 to reduce the frequency of a second clock signal "CLK2" for operating the active charge pump circuits 20 by reducing the frequency of a first clock signal "CLK1" according to the output signal of the other of the first comparator 8 and the second comparator 9.

Specifically, in this embodiment, the pump controlling circuit 3 controls the pump circuit 2 to reduce the frequency of the second clock signal according to an output signal "SFLG2" of the second comparator 9 when the second comparator 9 determines that the second monitor voltage "VMON2" is higher than the reference voltage "VREF".

Alternatively, the pump circuit 2 may be controlled to reduce the frequency of the second clock signal "CLK2" for operating the active charge pump circuits 20 by reducing the frequency of the first clock signal "CLK1" according to the output signal "SFLG1" of the first comparator 8 and to reduce the number of active charge pump circuits 20 according to the output signal "SFLG2" of the second comparator 9.

In addition, the pump controlling circuit 3 brings the pump circuit 2 into an inactive state according to the output signal of the third comparator 10.

That is, in this embodiment, when the third comparator 10 determines that the third monitor voltage "VMON3" is higher than the reference voltage "VREF", the pump controlling circuit 3 stops output of the first clock signal "CLK1" according to an output signal "SFLG3" of the third comparator 10, thereby bringing the pump circuit 2 into the inactive state. On the other hand, when the third comparator 10 determines that the third monitor voltage "VMON3" is lower than the reference voltage "VREF", the pump controlling circuit 3 outputs the first clock signal "CLK1" according to the output signal "SFLG3" of the third comparator 10, thereby bringing the pump circuit 2 into the active state.

Furthermore, the booster circuit 100 has a regulator 11 for controlling the amplitude of the second clock signal "CLK2".

In order to raise the output voltage "VPGM" at the first output terminal 1, the regulator 11 increases the amplitude of the second clock "CLK2".

The pump circuit 2 has a clock adjusting circuit 21 that generates the second clock signal "CLK2" for operating the charge pump circuits 20 from the first clock signal "CLK1" according to the output of the regulator 11.

As shown in FIG. 2, the regulator 11 has a first p-type MOS transistor 11a connected to the power supply "VDD" at the source thereof, a first n-type MOS transistor 11b connected to the power supply "VDD" at the drain thereof and to the drain of the first p-type MOS transistor 11a at the gate thereof, and a resistor 11c connected to the source of the first n-type MOS transistor 11b at one end thereof.

Furthermore, the regulator 11 has a current summing digital-to-analog converter 11d that is connected between the other end of the resistor 11c and the ground potential "VSS" and varies in resistance according to variations in resistance of the limiter circuit 7, and a fourth comparator 11e that receives the voltage at the other end of the resistor 11c at the inverting input terminal and a reference voltage "VREF2" at the non-inverting input terminal and provides output to the gate of the first p-type MOS transistor 11a.

Furthermore, the regulator 11 has a second n-type MOS transistor 11f that is connected to the power supply "VDD" at the drain thereof and to the drain of the first p-type MOS transistor 11a at the gate thereof and outputs a voltage signal "VPMPSUP" for controlling the amplitude of the second clock signal from the source thereof.

As shown in FIG. 3, the clock adjusting circuit 21 has a first inverter 21a that receives the first clock signal "CLK1" and is operated by the power supply "VDD", a second inverter 21b that receives the output of the first inverter 21a and is operated by the voltage signal "VPMPSUP", and a third inverter 21c that receives the first clock signal "CLK1" and is operated by the voltage signal "VPMPSUP".

Furthermore, the clock adjusting circuit 21 has a first capacitor 21d connected to the output of the second inverter 21b at one end thereof, a second capacitor 21e connected to the output of the third inverter 21c at one end thereof, a third n-type MOS transistor 21f that is connected to the other end of the first capacitor 21d and receives the voltage signal "VPMPSUP" at the drain thereof, and a fourth n-type MOS transistor 21g that is connected to the other end of the second capacitor 21e and the gate of the third n-type MOS transistor 21f at the source thereof and to the source of the third n-type transistor at the gate thereof and receives the voltage signal "VPMPSUP" at the drain thereof.

Furthermore, the clock adjusting circuit 21 has a fifth n-type MOS transistor 21h connected to the ground potential "VSS" at the source thereof and to the output of the second inverter 21b at the gate thereof, and a sixth n-type MOS transistor 21i connected to the ground potential "VSS" at the source thereof and to the output of the third inverter 21c at the gate thereof.

Furthermore, the clock adjusting circuit 21 has a second p-type MOS transistor 21j that is connected to the other end of the first capacitor 21d at the drain thereof and to the drain of the sixth n-type MOS transistor 21i at the source thereof, receives the voltage signal "VPMPSUP" at the gate thereof and outputs the second clock signal "CLK2" from the source thereof, and a third p-type MOS transistor 21k that is connected to the other end of the second capacitor 21e at the drain thereof and to the drain of the fifth n-type MOS transistor 21h at the source thereof, receives the voltage signal "VPMPSUP" at the gate thereof and outputs an inversion signal of the second clock signal "CLK2" from the source thereof.

As shown in FIG. 4, the clock adjusting circuit 21 outputs the second clock signal "CLK2" by increasing the amplitude of a clock signal "CLK1'", which is the first clock signal "CLK1" having passed through the inverters. In the configuration described above, the frequency of the second clock signal "CLK2" output from the clock adjusting circuit 21 varies with the frequency of the first clock signal "CLK1" input to the clock adjusting circuit 21.

The clock adjusting circuit 21 outputs the second clock signals "CLK2" and the inversion signal of the second clock signal "CLK2" by increasing or decreasing the amplitude thereof according to the voltage signal "VPMPSUP". Specifically, when the set value of the output voltage "VPGM" is lowered, the setting of the output current of the limiter circuit is lowered accordingly, and the setting of the output current of the current summing digital-to-analog converter 11d is also lowered accordingly. As a result, the value of the voltage signal "VPMPSUP" output from the regulator is lowered. Thus, the amplitude of the second clock signal "CLK2" output from the clock adjusting circuit 21 is reduced.

In this way, the clock adjusting circuit 21 reduced the amplitude of the second clock signal "CLK2" in response to the set value of the output voltage "VPGM" being lowered.

As shown in FIG. 5, for example, the charge pump circuit 20 has a MOS transistor 2b that is connected to the power supply "VDD" at the source thereof and has the source and the gate connected to each other, MOS transistors 2c to 2f that are connected in series between the drain of the MOS transistor 2b and the output terminal 1 and have the respective sources and gates connected to each other, and capacitors 2g to 2j connected to the sources of the MOS transistors 2c to 2f, respectively.

The second clock signal "CLK2" is input to the capacitors 2g and 2i, and the inversion signal of the second clock signal "CLK2" is input to the capacitors 2h and 2j. That is, since the second clock signal "CLK2" and the inversion signal thereof are input to the charge pump circuit 20, the MOS transistors 2c to 2f alternately operate, and the capacitors 2g to 2j are successively charged and boosted. Then, the boosted potential is output as the output voltage "VPGM".

As described earlier, the boosting capability of the charge pump circuit 20 can be lowered by reducing the amplitude of the second clock signal "CLK2".

Alternatively, as described earlier, the boosting capability of the charge pump circuit 20 can be lowered by reducing the frequency of the first clock signal "CLK1" (which results in a reduction in frequency of the second clock signal).

The boosting capability of the charge pump circuit 20 can be enhanced by increasing the capacitance of the capacitors 2g to 2j.

The charge pump circuit 20 is shown in FIG. 5 only for illustrative purposes, and any charge pump circuit that boosts the voltage of the power supply "VDD" according to the input second clock signal "CLK2" and outputs the boosted voltage can be used in this embodiment.

When raising the output voltage "VPGM" at the first output terminal 1, the booster circuit 100 keeps the composite resistance of the first variable resistor 4, the second variable resistor 5 and the third variable resistor 6 constant. In addition, the booster circuit 100 keeps the voltage division ratio between the second variable resistor 5 and the third variable resistor 6 constant. In this state, the resistance of the first variable resistor 4 is increased, while the resistance of the second variable resistor 5 and the third variable resistor 6 is decreased.

Similarly, when lowering the output voltage "VPGM" at the first output terminal 1, the booster circuit 100 keeps the composite resistance of the first variable resistor 4, the second variable resistor 5 and the third variable resistor 6 constant. In addition, the booster circuit 100 keeps the voltage division ratio between the second variable resistor 5 and the third variable resistor 6 constant. In this state, the resistance of the first variable resistor 4 is decreased, while the resistance of the second variable resistor 5 and the third variable resistor 6 is increased.

In this way, the potential difference between the first monitor voltage "VMON1" and the second monitor voltage "VMON2" and the potential difference between the second monitor voltage "VMON2" and the third monitor voltage "VMON3" can be adjusted. For example, the potential differences can be set at fixed values taking into account the offsets of the comparators so that the first comparator 8 and the second comparator 9 appropriately operate. That is, it is possible to appropriately operate a plurality of comparators.

Figure 6:
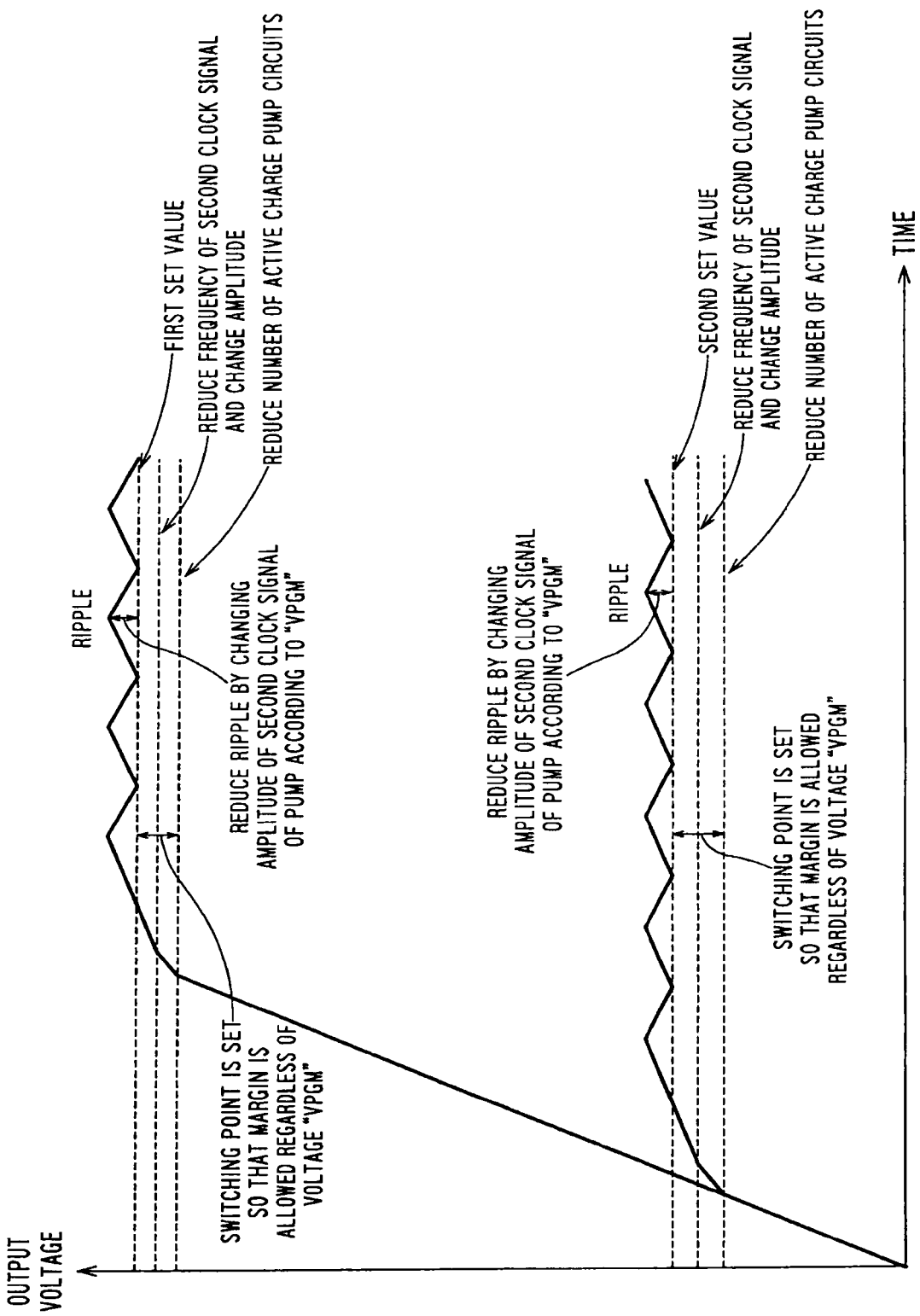
FIG. 6 is a diagram showing a relationship between time and output voltage of the booster circuit 100 set at two set values according to the embodiment of the present invention.

Now, a boosting operation of the booster circuit 100 configured as described above will be described. FIG. 6 is a diagram showing a relationship between time and output voltage of the booster circuit 100 set at two set values according to the Embodiment of the present invention.

First, there will be described a case where the output voltage "VPGM" is set at a first set value.

As shown in FIG. 6, the boosting operation of the pump circuit 2 causes the output voltage of the booster circuit 100 to rise. When the first monitor voltage "VMON1", which is a divided voltage value of the output voltage, becomes higher than the reference potential "VREF", the pump controlling circuit 3 controls the pump circuit 2 to reduce the number of active charge pump circuits 20 according to the output signal "SFLG1" of the first comparator 8. As a result, the boosting capability of the pump circuit 2 is reduced.

When the second monitor voltage "VMON2", which is a divided voltage value of the output voltage, becomes higher than the reference potential "VREF", the pump controlling circuit 3 controls the pump circuit 2 to reduce the frequency of the second clock signal "CLK2" according to the output signal "SFLG2" of the second comparator 9. In addition, according to the first set value of the output voltage, the amplitude of the second clock signal "CLK2" is changed according to the output voltage "VPMPSUP" of the regulator 11.

When the third monitor voltage "VMON3", which is a divided voltage value of the output voltage, becomes higher than the reference potential "VREF", the pump controlling circuit 3 stops output of the second clock signal "CLK2" and brings the pump circuit 2 into the inactive state according to the output signal "SFLG3" of the third comparator 10.

Now, there will be described a case where the output voltage "VPGM" is set at a second set value, which is lower than the first set value. In this case, the output current of the limiter circuit 7 and the current summing digital-to-analog converter 11d of the regulator 11 is set to be smaller than in the case of the first set value. The potential differences between the monitor voltages are the same as those in the case of the first set value, because the resistances of the variable resistors are adjusted in the same manner as described above.

As shown in FIG. 6, the boosting operation of the pump circuit 2 causes the output voltage of the booster circuit 100 to rise. When the first monitor voltage "VMON1", which is a divided voltage value of the output voltage, becomes higher than the reference potential "VREF", the pump controlling circuit 3 controls the pump circuit 2 to reduce the number of active charge pump circuits 20 according to the output signal "SFLG1" of the first comparator 8. As a result, the boosting capability of the pump circuit 2 is reduced.

When the second monitor voltage "VMON2", which is a divided voltage value of the output voltage, becomes higher than the reference potential "VREF", the pump controlling circuit 3 controls the pump circuit 2 to reduce the frequency of the second clock signal "CLK2" according to the output signal "SFLG2" of the second comparator 9. In addition, according to the second set value of the output voltage, the amplitude of the second clock signal "CLK2" is changed according to the output voltage "VPMPSUP" of the regulator 11. In this case, since the lower output voltage is set, the output current of the charge pump circuit 20 increases. Thus, in order to reduce a ripple as in the case of the first set value, the amplitude of the second clock signal "CLK2" is reduced further than in the case of the first set value to reduce the output current of the charge pump circuit 20, thereby reducing the boosting capability of the pump circuit 2.

When the third monitor voltage "VMON3", which is a divided voltage value of the output voltage, becomes higher than the reference potential "VREF", the pump controlling circuit 3 stops output of the first clock signal "CLK1" and brings the pump circuit 2 into the inactive state according to the output signal "SFLG3" of the third comparator 10.

In this way, the ripple can be reduced, since the boosting capability of the pump circuit 2 is reduced as the output voltage approaches the first or second set value.

In addition, since the amplitude of the second clock signal "CLK2" is changed according to whether the set value is the first or second set value, the ripple can be reduced even if the output voltage is set at the low set value.

In addition, since the potential differences between the monitor voltages are kept constant even if the set value of the output voltage is changed, the comparators can be operated appropriately.

In this way, the booster circuit 100 can reduce the ripple while appropriately operating the comparators for difference set values of the output voltage.

Now, there will be discussed a result of simulation of supplying a voltage to a word line of a NAND flash memory from the booster circuit 100.

Figure 7:
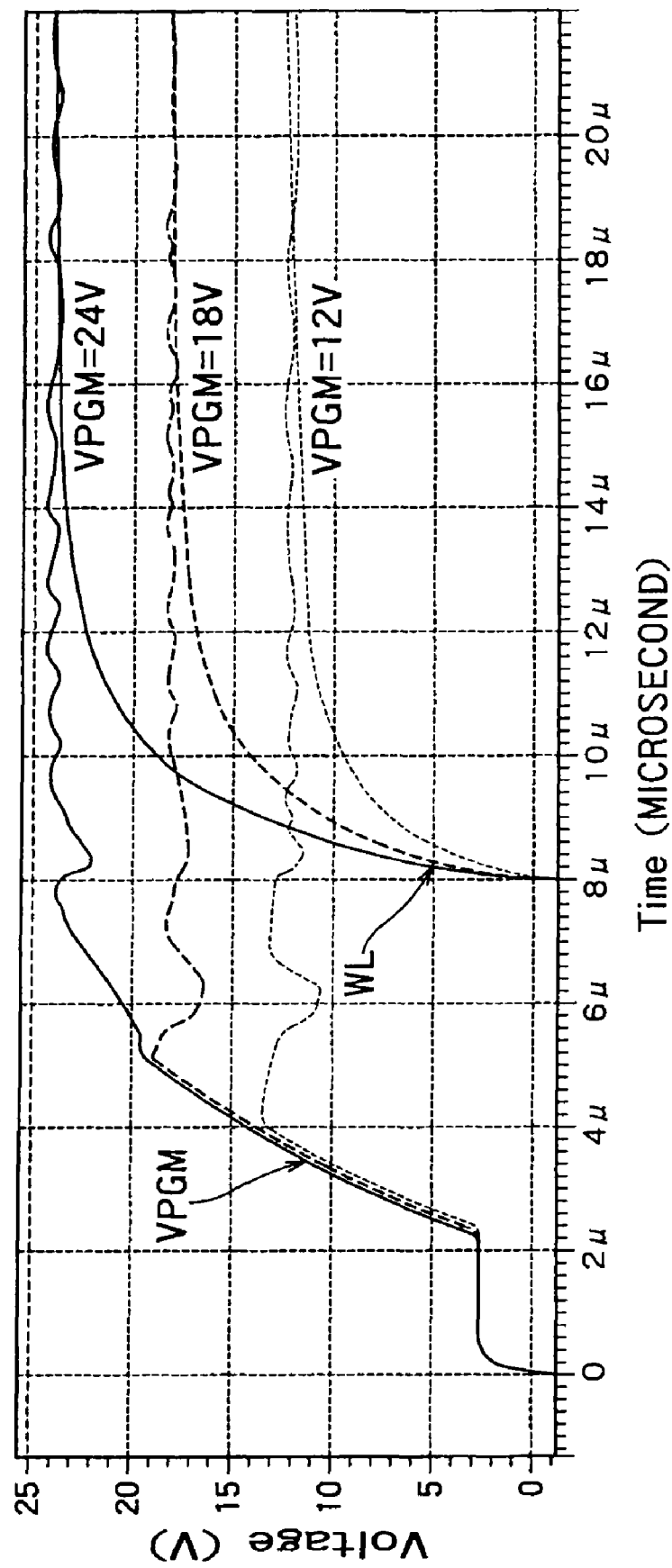
FIG. 7 is a diagram showing waveforms of the output voltage of the booster circuit according to the embodiment and waveforms of the voltage on the word line to which the voltage is supplied from the booster circuit.
Figure 8:
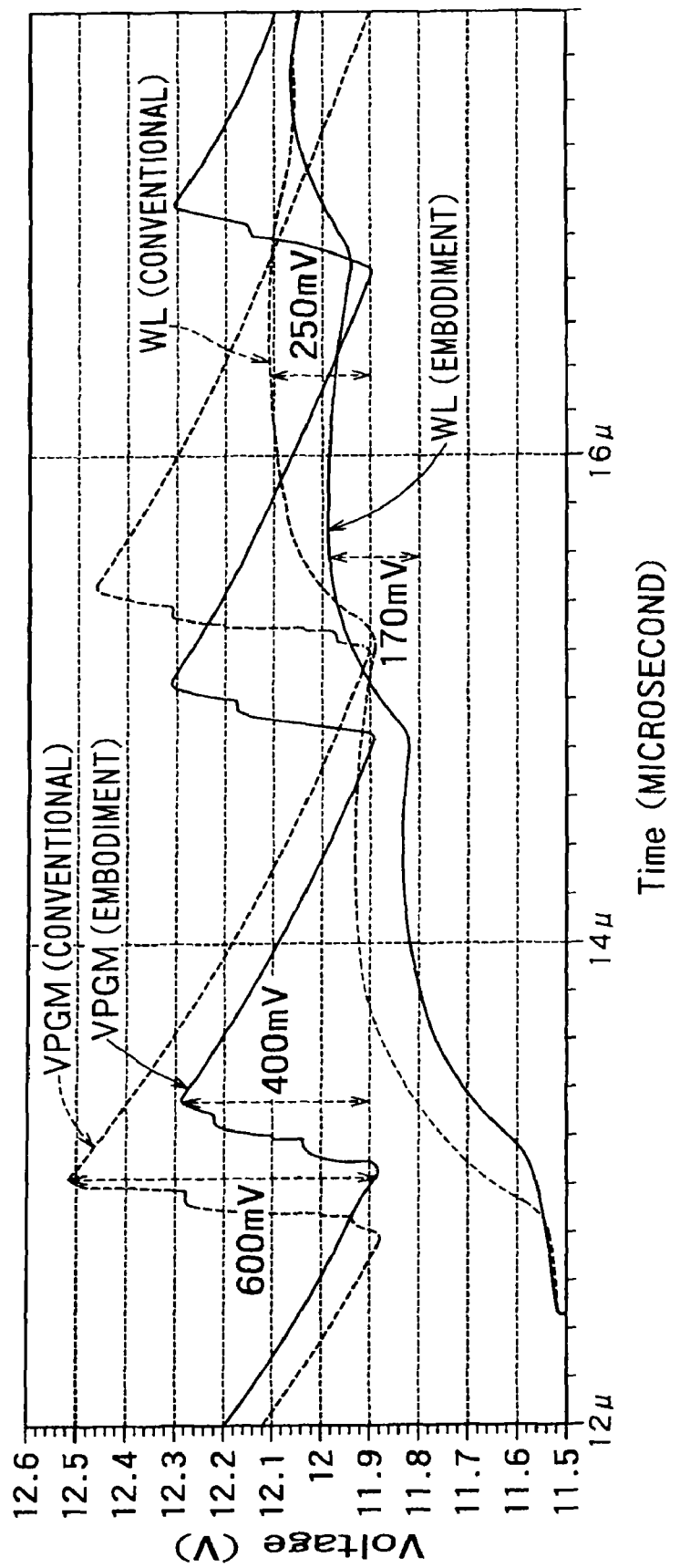
FIG. 8 is a diagram showing waveforms of the output voltage (12V) of a conventional booster circuit and the booster circuit according to the embodiment and waveforms of the voltage on the word line to which the voltage is supplied from the booster circuits.

FIG. 7 is a diagram showing waveforms of the output voltage of the booster circuit according to the Embodiment and waveforms of the voltage on the word line to which the voltage is supplied from the booster circuit. FIG. 8 is a diagram showing waveforms of the output voltage (12V) of a conventional booster circuit and the booster circuit according to the Embodiment and waveforms of the voltage on the word line to which the voltage is supplied from the booster circuits.

As shown in FIG. 7, the booster circuit 100 can supply different voltages to the word line.

Furthermore, as shown in FIG. 8, in the booster circuit 100, the ripple in the output voltage "VPGM" is reduced compared with the conventional booster circuit. Furthermore, the ripple on the word line connected to the booster circuit 100 via a ripple filter circuit are also reduced compared with the conventional booster circuit.

Now, there will be discussed speed-up of rising of the voltage on the word line when a program voltage is supplied from the booster circuit 100 configured as described above.

Even when supplying a low voltage, the booster circuit 100 can reduce the ripple. However, the higher the voltage supplied from the booster circuit 100, the more sufficiently the booster circuit 100 can reduce the ripple. Thus, the filtering performance of the ripple filter circuit is changed according to the output voltage.

Figure 9:
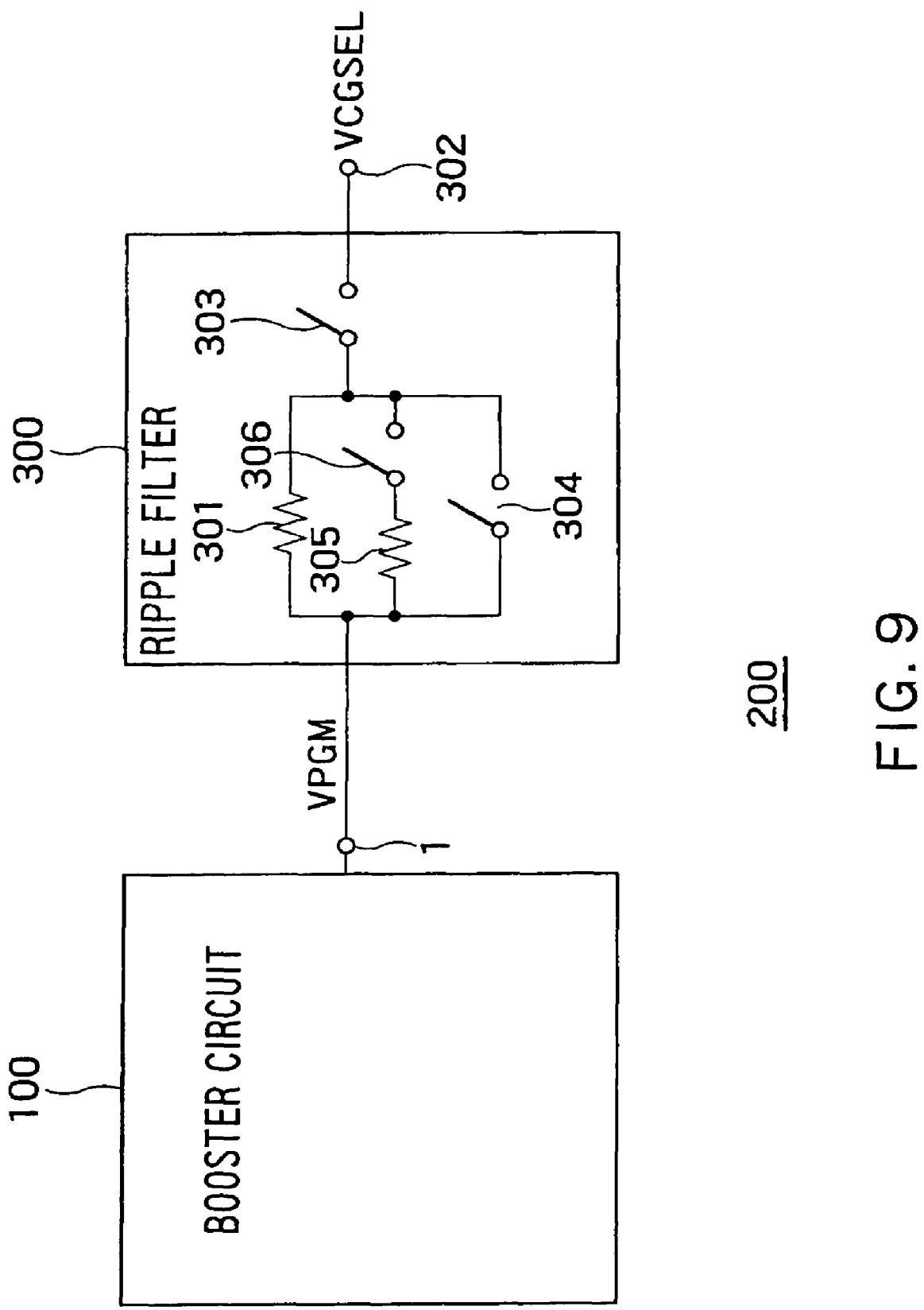
FIG. 9 is a diagram showing a configuration of essential parts of a voltage supply circuit according to the embodiment.

FIG. 9 is a diagram showing a configuration of essential parts of a voltage supply circuit according to the Embodiment. As shown in FIG. 9, a voltage supply circuit 200 has the booster circuit 100 that outputs the output voltage "VPGM", and a ripple filter circuit 300 that filters out ripples in the output voltage "VPGM" and outputs a voltage "VCESEL" to be supplied to a word line, for example.

The ripple filter circuit 300 has a first resistor 301 connected to the first output terminal 1 of the booster circuit 100 at one end thereof, a first switch circuit 303 connected between the other end of the first resistor 301 and a second output terminal 302 for outputting the voltage "VCESEL", a second switch circuit 304 connected between the first output terminal 1 of the booster circuit 100 and the first switch circuit 303, a second resistor 305 connected to the first output terminal 1 at one end thereof and having a resistance lower than that of the first resistor 301, and a third switch circuit 306 connected between the other end of the second resistor 305 and the first switch circuit 303.

The ripple filter circuit 300 controls the second switch circuit 304 and the third switch circuit 306 according to the magnitude of the ripple to adjust the composite resistance.

For example, in a case of a low output voltage "VPGM", the ripple filter circuit 300 turns on the first switch circuit 303 and turns off the second switch circuit 304 and the third switch circuit 306. Thus, the output voltage "VPGM" is filtered by the first resistor 301 having a high resistance.

Furthermore, for example, in a case of a middle output voltage "VPGM", the ripple filter circuit 300 turns on the first switch circuit 303, turns off the second switch circuit 304 and turns on the third switch circuit 306. Thus, the output voltage "VPGM" is filtered by the composite resistance of the first resistor 301 and the second resistor 305.

Furthermore, for example, in a case of a high output voltage "VPGM", the ripple filter circuit 300 turns on the first switch circuit 303, turns on the second switch circuit 304 and turns off the third switch circuit 306. Thus, the output voltage "VPGM" is output to the second output terminal 302 without being filtered.

In this way, if filtering of the output voltage "VPGM" is not required, the ripple filter circuit 300 outputs the output voltage "VPGM" without change. Thus, rising of the voltage on the word line when the booster circuit 100 supplies a program voltage can be speeded up.

While the ripple filter circuit described above has three paths composed of two resistors and one bypass, the ripple filter circuit may have paths composed of one resistor and one bypass or of three or more resistors and one bypass.

Now, there will be discussed a result of simulation of supplying a voltage to a word line of a NAND flash memory from the voltage supply circuit 200.

Figure 10:
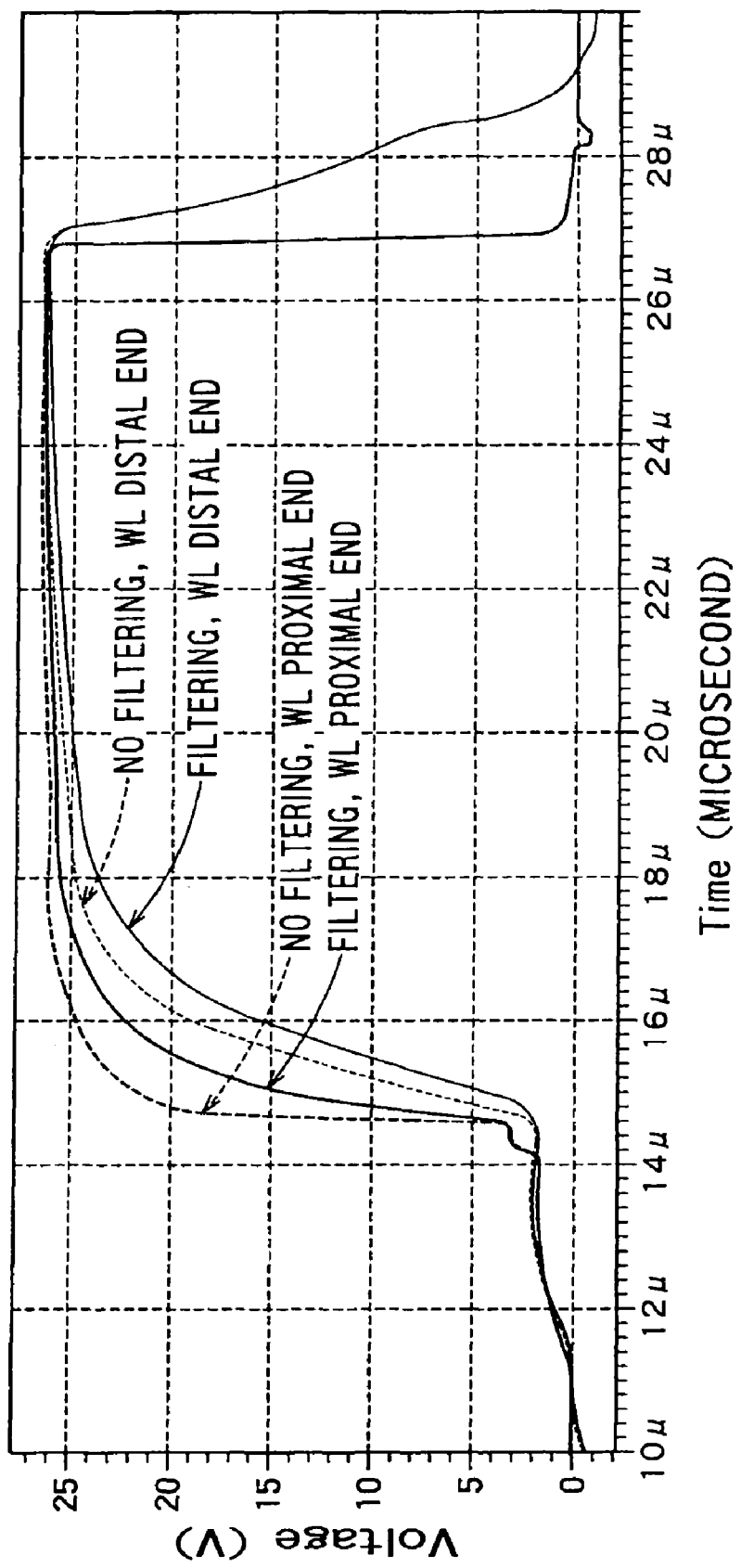
FIG. 10 is a diagram showing a result of simulation of filtering in a case of a high output voltage "VPGM" (about 26 V, for example)
Figure 11:
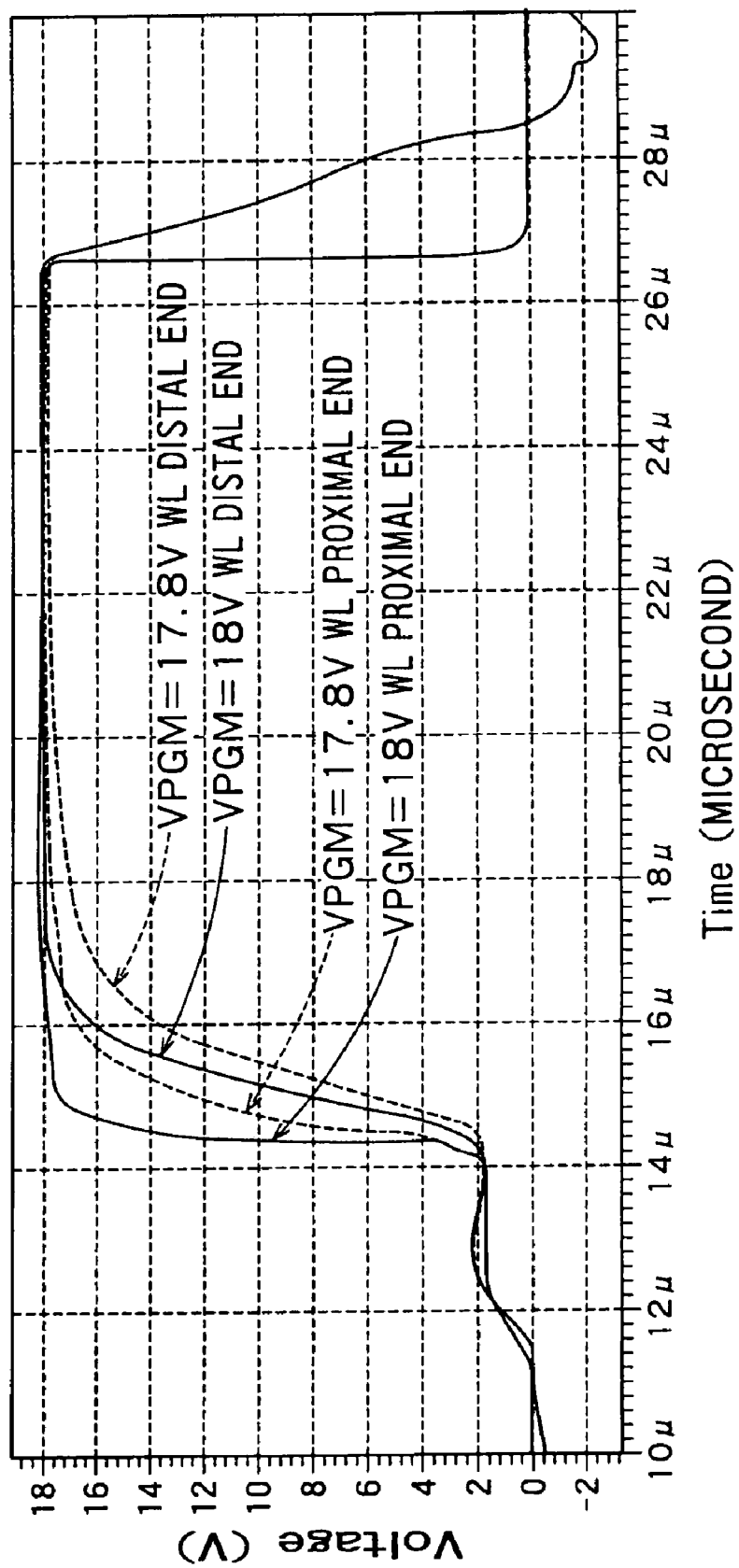
FIG. 11 is a diagram showing a result of simulation of filtering in a case of a high output voltage "VPGM" (about 18 V, for example)

FIG. 10 is a diagram showing a result of simulation of filtering in a case of a high output voltage "VPGM" (about 26 V, for example). FIG. 11 is a diagram showing a result of simulation of filtering in a case of a high output voltage "VPGM" (about 18 V, for example).

As shown in FIG. 10, for example, when the output voltage "VPGM" is high (about 26 V, for example), and filtering is not required, the ripple filter circuit 300 outputs the output voltage "VPGM" without change. Thus, compared with a case filtering is carried out, the rise time can be shortened by about 2 microseconds at the proximal and distal ends of the word line.

Furthermore, as shown in FIG. 11, comparing the waveforms at a point (around 18 V, for example) where the ripple filter circuit 200 determines whether to carry out filtering or not, the rise time is shorter in the case where filtering is not carried out (18 V).

In this way, the voltage supply circuit 200 can speed up rising of the program voltage on the word line, for example.

As described above, the booster circuit according to this embodiment can appropriately reduce the ripple for a plurality of set potentials.

Furthermore, the voltage supply circuit according to this embodiment can speed up rising of the program voltage on the word line, for example, In this embodiment described above, there is provided one comparator for generating a signal for reducing the number of active charge pump circuits. However, a plurality of comparators may be provided for different monitor voltages.

Now, there will be described an example in which the voltage supply circuit 200 that operates as described above is applied to a NAND flash memory.

Figure 12:
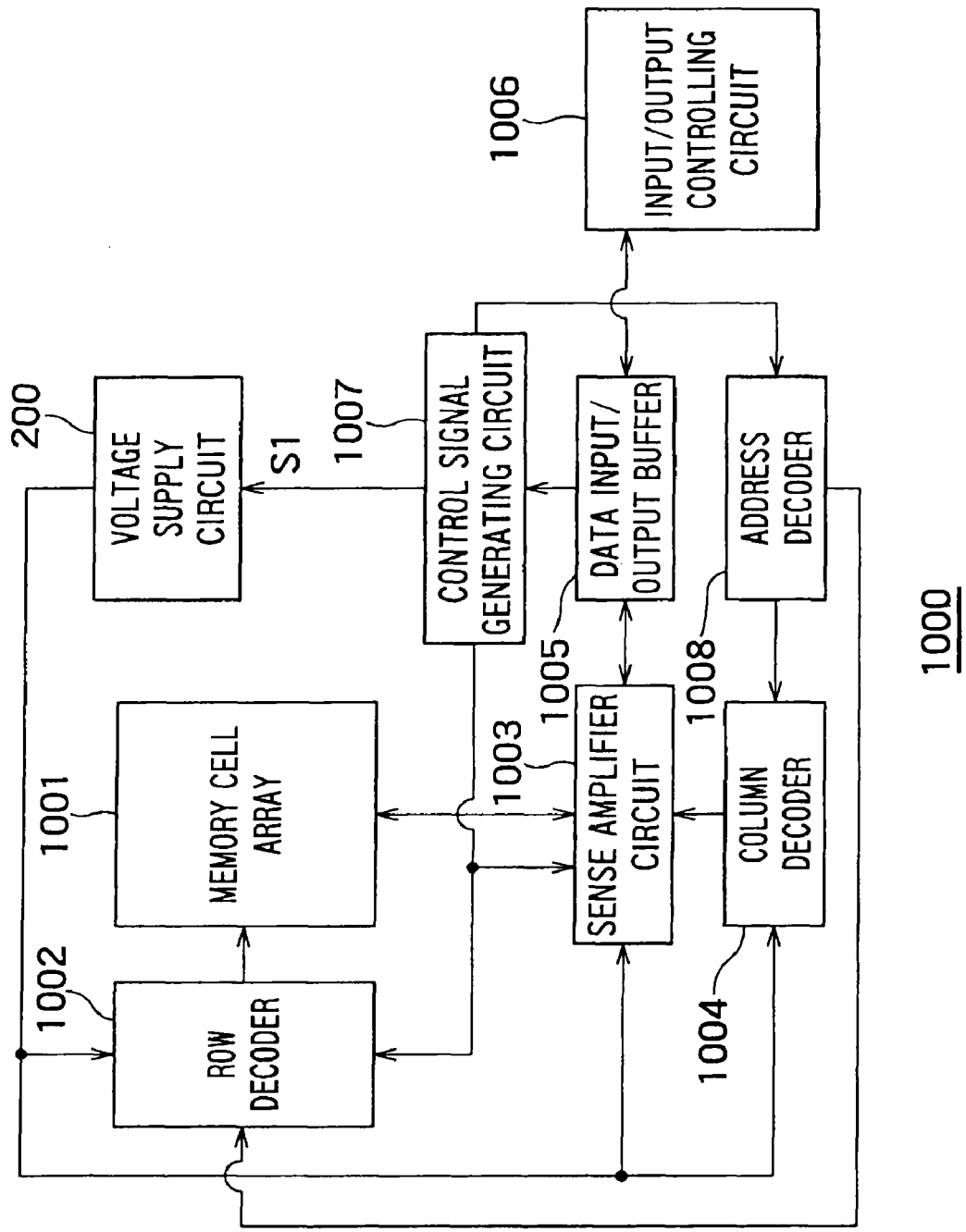
FIG. 12 is a block diagram showing an example of a NAND flash memory having the voltage supply circuit according to the embodiment of the present invention.

FIG. 12 is a block diagram showing an example of a NAND flash memory having the voltage supply circuit according to the embodiment of the present invention.

As shown in FIG. 12, a semiconductor storage device 100, which is a NAND flash memory, has the voltage supply circuit 200 according to the embodiment, a memory cell array 1001 having memory cells for storing data, a row decoder 1002, a sense amplifier circuit 1003, a column decoder 1004, a data input/output buffer 1005, an input/output controlling circuit 1006, a control signal generating circuit 1007, and an address decoder 1008.

The row decoder 1002 is connected to word lines of the memory cell array 1001. The row decoder 1002 includes a word line driving circuit (not shown) and makes a selection from and drives the word lines of the memory cell array 1001.

The sense amplifier circuit 1003 is connected to bit lines of the memory cell array 1001. The sense amplifier circuit 1003 reads data from the memory cells and stores the read data and data written to the memory cells.

The column decoder 1004 makes a selection from the bit lines of the memory cell array 1001.

When reading data, data read by the sense amplifier circuit 1003 is output to the input/output controlling circuit 1006 via the data input/output buffer 1005.

The input/output controlling circuit 1006 supplies a command to the control signal generating circuit 1007 via the data input/output buffer 1005. The control signal generating circuit 1007 decodes the command.

In addition, the control signal generating circuit 1007 is supplied with an external control signal, such as a chip enable signal "CE", a write enable signal "WE", a read enable signal "RE", an address latch enable signal "ALE" and a command latch enable signal "CLE".

The control signal generating circuit 1007 carries out a sequence control of data writing and erasing and a control of data reading based on the external control signal and command supplied thereto according to the operation mode.

Signals for controlling various operations including reading, writing and erasing (including a control signal "S1") output from the control signal generating circuit 1007 make the voltage supply circuit 200 generate voltages appropriate for the respective operations. As shown in FIG. 12, the generated voltage is supplied to the memory cells in the memory cell array 1001 via the row decoder 1002, for example.

The address of the memory cell is provided from the input/output controlling circuit 1006 via the data input/output buffer 1005. The address is transferred to the row decoder 1002 and the column decoder 1004 via the address decoder 1008.

Now, there will be discussed an advantage of the voltage supply circuit according to the embodiment applied to the semiconductor storage device, such as a NAND flash memory, configured as described above.

There is a multi-level NAND flash memory that has a plurality of thresholds for data storage by changing the amount of electrons stored in the floating gate of a memory cell, for example. As the number of levels increases (to eight or sixteen, in particular), there arise problems concerning separation of threshold distributions, data interference with adjacent memory cells, and erroneous data reading between adjacent thresholds. Thus, the memory cells are required to have a narrow threshold distribution.

Figure 13:
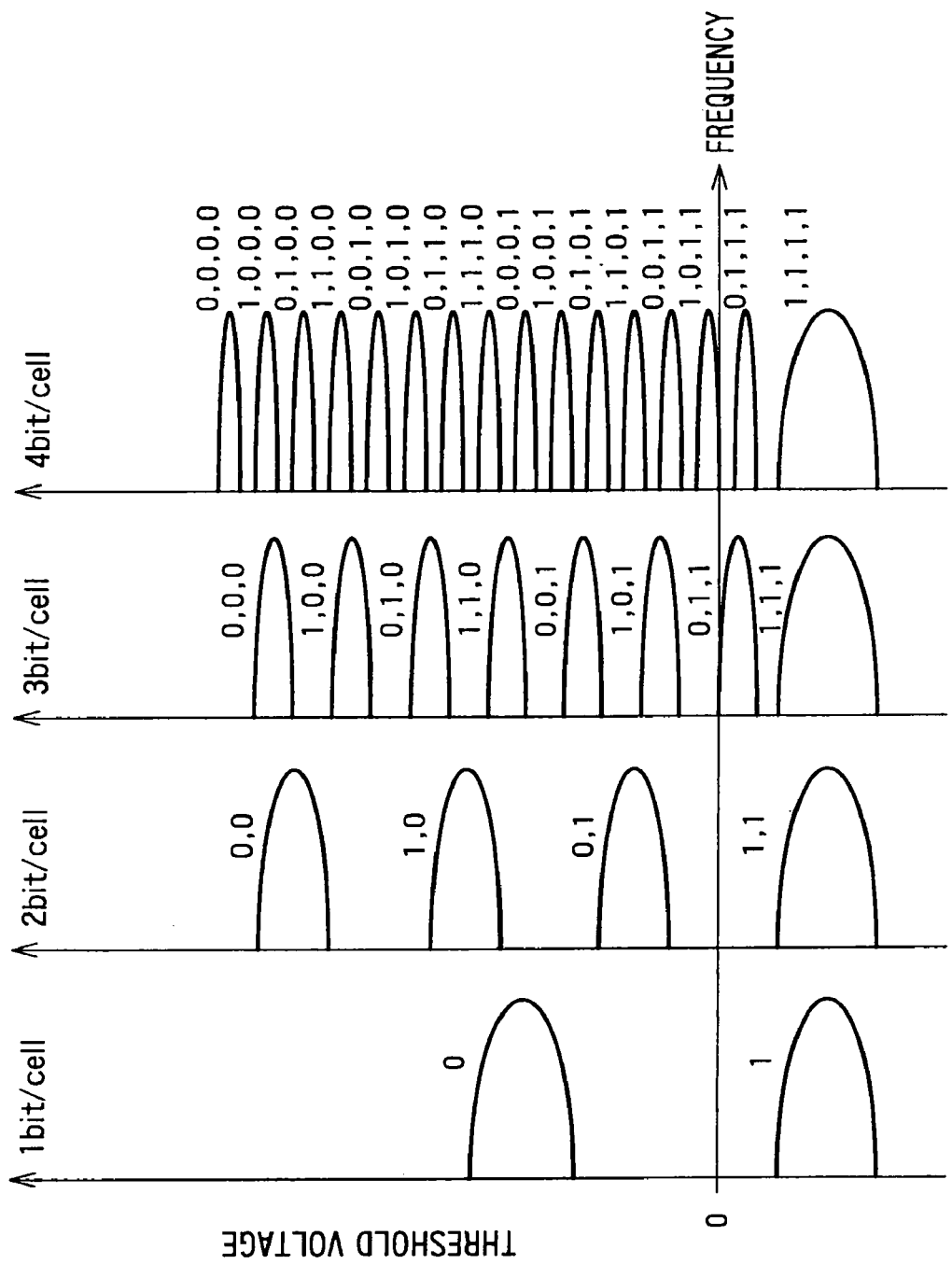
FIG. 13 is a diagram showing threshold distributions of NAND flash memories for storing binary data or multi-level data.

FIG. 13 is a diagram showing threshold distributions of NAND flash memories for storing binary data or multi-level data.

As shown in FIG. 13, as the number of levels increases, narrower threshold distributions are required. In a case where a memory cell having a conventional configuration is adapted for 16 levels, for example, a threshold distribution over 200 to 300 mV can be achieved by setting the increment of the writing voltage "$\Delta Vpgm$" at about 30 mV.

However, if the ripple occurring in the booster circuit is large, the writing voltage cannot be appropriately incremented.

The ripple can be reduced to 100 mV or lower if the voltage supply circuit 200 according to the Embodiment is applied. Thus, multi-level NAND flash memories (in particular, 8-levels or 16-levels) can be operated in a desired manner without the problems described above.

What is claimed is:

1. A booster circuit, comprising:
   a pump circuit having a plurality of charge pump circuits for outputting a boosted voltage to a first output terminal;
   a clock adjusting circuit that generates, from a first clock signal, a second clock signal for operating said plurality of charge pump circuits;
   a pump controlling circuit that outputs the first clock signal for operating said pump circuit;
   a first comparator coupled to said first output terminal that outputs a first output signal to said pump controlling circuit;
   a second comparator coupled to said first output terminal that outputs a second output signal to said pump controlling circuit; and
   a third comparator coupled to said first output terminal that outputs a third output signal to said pump controlling circuit, wherein a gradient of the boosted voltage is decreased when the first output signal is output to the pump controlling circuit,
   a frequency of the first clock signal is reduced when the second output signal is output to the pump controlling circuit, and
   the third output signal is output to the pump controlling circuit when the boosted voltage is higher than a set value of the boosted voltage.

2. The booster circuit according to claim 1, further comprising:
   a regulator, wherein an amplitude of the first clock signal is reduced by an output voltage of the regulator when the set value of the boosted voltage is set lower.

3. The booster circuit according to claim 1, further comprising:
   a first variable resistor connected to said first output terminal at one end thereof;
   a second variable resistor connected to the other end of said first variable resistor at one end thereof;
   a third variable resistor connected to the other end of said second variable resistor at one end thereof;
   a limiter circuit capable of adjusting a current flowing through the first variable resistor connected to the first output terminal, the second variable resistor connected to the other end of the first variable resistor and the third variable resistor connected to the other end of the second variable resistor.

4. The booster circuit according to claim 1, wherein the first comparator outputs the first output signal when the boosted voltage is higher than a first voltage, and
   the second comparator outputs the second output signal when the boosted voltage is higher than a second voltage.

5. The booster circuit according to claim 4, wherein the second voltage is higher than the first voltage, and the set value of the boosted voltage is higher than the second voltage.

6. The booster circuit according to claim 1, wherein the boosted voltage raises after the third output signal is output, and then comes down.

7. The booster circuit according to claim 1, wherein the first output signal is a signal to reduce a number of active ones of the plurality of charge pump circuits.

8. The booster circuit according to claim 1, wherein the third output signal is a signal to bring the pump circuit into an inactive state.

9. The booster circuit according to claim 1, wherein the pump controlling circuit receives the first, second and third output signals, and controls the pump circuit.

10. The booster circuit according to claim 4, wherein the pump controlling circuit receives the first, second and third output signals, and controls the pump circuit.

11. The booster circuit according to claim 10, wherein the first output signal is a signal to reduce a number of active ones of the plurality of charge pump circuits.

12. The booster circuit according to claim 10, wherein the third output signal is a signal to bring the pump circuit into an inactive state.

* * * * *